United States Patent [19]
Edman

[11] Patent Number: 5,083,390
[45] Date of Patent: Jan. 28, 1992

[54] MODULAR SIGN

[76] Inventor: David C. Edman, 14 N. Walnut St., Mechanicsburg, Pa. 17055

[21] Appl. No.: 548,569

[22] Filed: Jul. 5, 1990

[51] Int. Cl.⁵ .............................................. G09F 15/00
[52] U.S. Cl. ....................................... 40/606; 40/610; 403/263
[58] Field of Search ................ 40/606, 607, 610, 611, 40/612; 403/240, 252, 254, 263, 260

[56] References Cited

U.S. PATENT DOCUMENTS

| | | | |
|---|---|---|---|
| 1,384,106 | 7/1921 | Taussig | 40/606 |
| 1,601,819 | 10/1926 | Ganster | 40/606 |
| 1,968,209 | 7/1934 | Irby | 40/606 |
| 3,180,663 | 4/1965 | Lehmann | 403/263 |
| 3,747,965 | 7/1973 | Wing | 403/252 |
| 3,837,754 | 9/1974 | Malcik | 403/263 |
| 3,868,630 | 2/1975 | Lesondak | 40/606 |
| 4,408,407 | 10/1983 | Bloom et al. | 40/607 |
| 4,916,840 | 4/1990 | Getz | 40/611 |

FOREIGN PATENT DOCUMENTS 665516 1/1952 United Kingdom ................ 40/606

Primary Examiner—Kenneth J. Dorner
Assistant Examiner—Brian K. Green
Attorney, Agent, or Firm—Richard C. Litman

[57] ABSTRACT

A modular sign consists of an H-shaped metal frame. The pointed legs can be driven into the earth by stepping on the cross rail. Plastic side tubes are slid over the upper arms of the H. The tubes have slots cut through the side partway down from the top; the edges of a sign board are inserted into them. The top and bottom edges of the sign board are inserted into slots cut into the sides of a top and bottom tube, respectively. The ends of the top and bottom tubes are inserted into holes bored through the side tubes, which are of larger diameter than the top and bottom tubes. Thus the sign board's edges are completely covered by the tubes. For extra strength the top tube may be fastened to the side tubes at either end. For indoor use, the lower frame legs are slid into feet in the shape of an inverted T for stability.

1 Claim, 3 Drawing Sheets

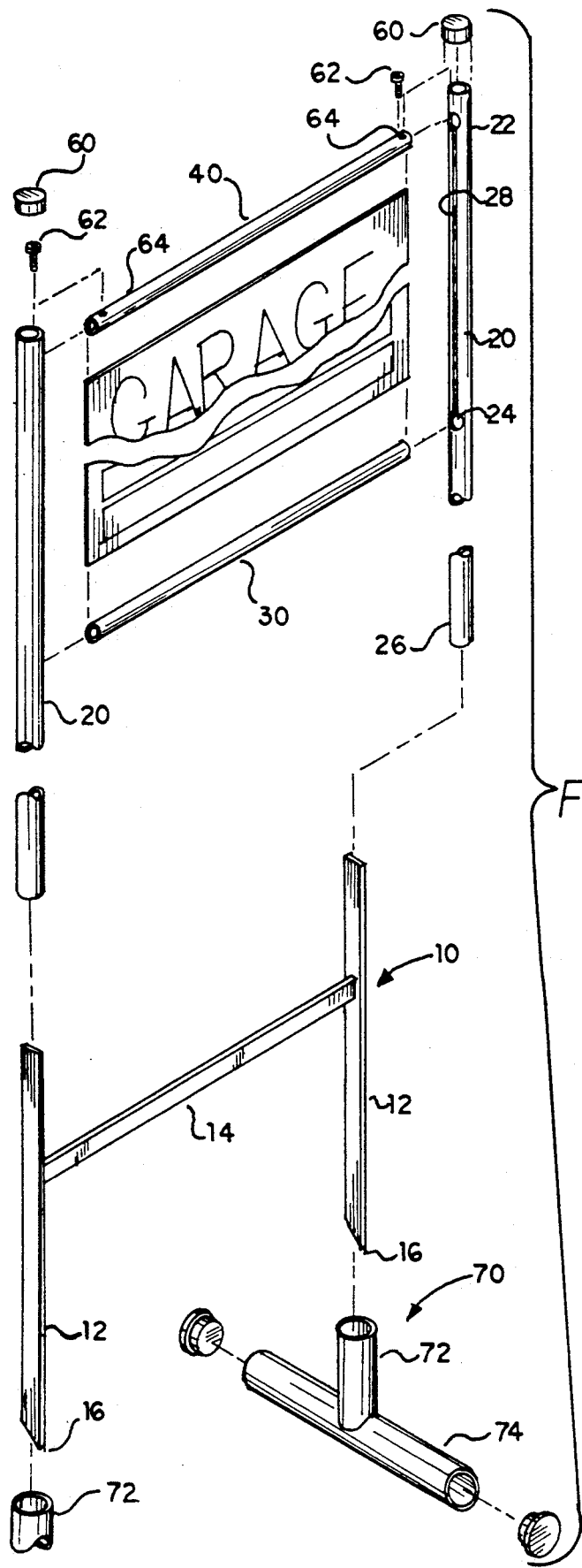
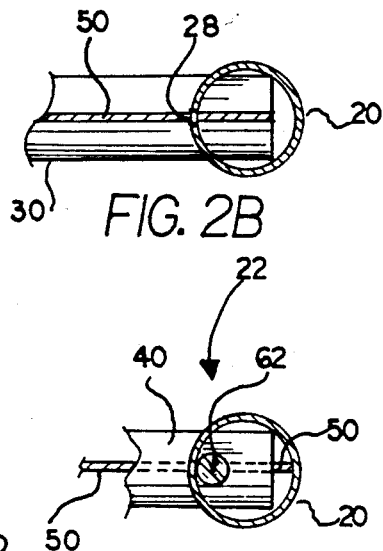

MODULAR SIGN

FIELD OF THE INVENTION

The present invention relates to portable outdoor signs.

BACKGROUND OF THE INVENTION

Portable, cheap and easily-erected outdoor signs are much needed in many fields, particularly real estate. Often the signs available suffer from drawbacks such as bulk, fragility, weight and poor appearance.

DESCRIPTION OF THE PRIOR ART

Prior-art signs designed for portability typically have included a frame and a board, sheet, or other planar element for showing the letters and pictures to be displayed. The planar element is stretched over, slid into, or otherwise fastened to the frame. Also, there must be a means for locating the frame. If the frame will not sit stably upon a surface under its weight, it is usually located by hanging it or driving part of the frame into the earth.

The frame in some designs is rigid, and in others the frame folds or comes apart into sections.

One design, typified by U.S. Pat. No. 4,742,633 of Snediker, utilizes a single post for the frame, having a sharpened bottom end for driving into the ground. A rigid sign board is cantilevered from one side of the post. This arrangement suffers from mechanical weakness due to the single line of attachment of the board, and requires either a hammer or a bulky projection from the post for driving it into the ground.

Snediker employs a hollow post of square cross sectional metal tubing. The upper end of the post has a longitudinal groove on one face. The sign board is of such a thickness that it will slide into this groove. The sign board is located relative to the post by pins through the board on the end slid into the post. The pins prevent the board from rotating out of the post under the force of gravity.

Parisi, in U.S. Pat. No. 4,068,398, also shows square cross sectional tubing with a groove at the top end.

Another single-post design is that of Reimel, disclosed in U.S. Pat. No. 2,926,442. Here the sign board hangs from a rigid subframe, which is cantilevered from the post.

U.S. Pat. Nos. 4,259,803 of Sittler and 4,524,533 of Still, Jr. also disclose single-post frames. Both of these designs use horizontal rails attached to the vertical post to support the sign board.

Folding frames are used by Farmer (U.S. Pat. No. 4,441,085), Mathis (U.S. Pat. No. 4,232,466), and Dalum (U.S. Pat. No. 3,591,116). All these designs employ a wide base to make the frame stable when unfolded. Folding reduces the bulk. However, folding frame structures are less durable and more troublesome than rigid frame structures.

In U.S. Pat. No. 4,103,445, Smith et al. disclose a foldingframe design employing a thin sheet of elastic material for displaying lettering. Their frame has the form of an inverted letter U. The ends are driven into the earth, which locates the frame. By driving the legs of the frame in the earth the proper distance apart the sheet is stretched over the frame.

U.S. Pat. No. 4,092,792 of Vorhees discloses a rigid, welded-metal rectangular frame. The two vertical post members of the frame are angle stock, sharpened at one end for insertion into the earth. The posts are rotated so that the acute angles of the angle stock from which they are made are facing each other; more precisely, when one views the frame from above the bisectors of the acute angles of the two posts are colinear and facing each other.

Vorhees' rectangular frame is completed by top and bottom rails welded across from post to post. The bottom rail is solid, and two top rails are parallel, at the same height, and spaced apart in the horizontal direction, leaving a gap between the top bars.

A sign board of the proper thickness can be inserted between the top rails into the space contained within the acute angles of the angle-stock posts. If the board is of the proper width, its edges will slide within the acute angles of the posts, and the board will be located in the horizontal dimensions by the posts. The sign board rests against the solid bottom bar.

Edman (U.S. Pat. No. 4,604,820) also shows a rigid frame with posts of inwardly-facing angle stock to located a sign board, two top rails spaced to slidingly accept the sign board, and a single bottom rail.

Snell, in U.S. Pat. No. 2,048,359, discloses a sign having a built-up sign board and border-covering edging strips and corners. The strips have a generally U-shaped cross section consisting of, first, a rounded part in the shape of a section of a circle, and second, two parallel straight parts attached to the round part at the edges of the gap of the circle. The straight parts are parallel and serve to cover and grip a section of the faces of the sign board; the circular part covers the edge. The corners have the same cross section, but when viewed at right angles to the sign board are curved around a ninety-degree corner, rather than being straight.

Snell discloses no frame.

SUMMARY OF THE INVENTION

One object of the present invention is an improved modular sign that is attractive, inexpensive, sturdy and portable.

A further object is a sign that can be assembled and disassembled without tools or with a minimum number of tools.

Another object is a sign whose parts can be easily stored.

An additional object is a sign made of pipe but avoiding the appearance typical of pipe constructions.

A further object is a sign that can be emplaced in earth or set onto a hard surface without scratching that surface.

Still another object is a modular sign, wherein one part can be used in several complete signs.

Still another object is a sign having smooth joints between the tubes that are easily assembled.

Accordingly, the present invention is a modular sign for use in real estate sales and the like, where signs must be erected in various places, indoors and out, and must be easily stored and erected.

The modular sign consists in part of a frame in the shape of a capital letter H. In use, the two side posts of the frame are vertical and the cross rail is horizontal.

The other parts of the invention are: a rigid sign board, either lettered or blank for supporting lettered cardboard and the like; and tubes surrounding and holding the board.

Each tube has a groove or slot into which an edge of the sign board inserts. There are between two and four tubes. The four tubes are: top, bottom and two side tubes. The top and bottom tubes may be omitted in some embodiments.

The two side tubes slide onto the upper ends of the frame posts and are thereby located to the frame.

The tubes can be pipes, channels or extrusions of any cross section which will both engage an edge of the sign board and also, in the case of the side tubes, slidingly accept the vertical frame posts. The slots or grooves in the tubes, which engage the sign board edges, can be dimensioned so as to grip the edges by friction. The preferred tube is round PVC plastic piping, cut to length and slotted with a router or the like. Plastic pipe is inexpensive, easily worked, attractive in appearance, corrosion proof, and maintenance free.

The sign board is attached to the frame and located horizontally by the side tubes. For vertical location of the sign board, the friction of the slots in the side tubes holds it in place against gravity. If top and/or bottom tubes are used, these also can be slotted to additionally hold the sign board.

The top and bottom tubes must be joined to the side tubes at either end. Depending on the particular embodiment, these joints may take on various forms.

One form of joint is a simple insertion of the top or bottom tube into apertures on the inward faces of the side tubes. Since the side tubes are prevented from varying their distance by being slid onto the fixed upper frame post sections, then the top and bottom tubes, if of the proper length, will be trapped at their ends within the opposing apertures of the side tubes.

(This joint, like the others to be described below, avoids the "plumbing look" that results from using pipe T and L connectors, or other external connectors.)

If the frame posts extend only part way into the side tubes, the side tubes will be liable to wobble about the line of the frame posts. In this case, a more securely fixed form of tube joint may be used where the top tube meets the side tubes. The tubes may be snapped together if properly shaped, or fastened by screws, or fixed by a combination of screws and plugs. End caps or plugs may be used at the top of the side tubes for appearance. Because the sign is designed for easy erection, the joints should require a minimum of tools.

Various forms of joint are discussed in the Description of the Preferred Embodiment.

Depending on the overall design height of the sign, the horizontal frame cross rail can be either below the bottom tube or inside it. By properly grooving the bottom tube, it can be made to accept internally both the rail and board edge.

The modular nature of the invention allows flexibility in erecting various versions of the sign. For example, one frame can be used to build several different signs having a common width and side tube diameter. These signs might have varying board height and/or overall height; or, they might have several sign boards, one above the other. Likewise, one set of side tubes could be an element of several signs of varying width.

For use indoors, feet made of tubing similar to that of the side tubes can be fabricated in the shape of the inverted letter T. The sharpened lower ends of the frame posts may then slide into the open end of the vertical tube of the T, while the horizontal cross tube of the T rests upon the floor. The feet both stabilize the sign and prevent scratching of the floor by the sharp metal tips of the posts.

The sign can also be hung by means of a suitable bracket.

For use with a rider, that is, an auxiliary sign board to be placed above or below the primary sign board, each of the single side tubes can be replaced by a set of two telescoping coaxial tubes. The coaxial tubes' slots would overlap. As the telescoping tubes were extended, the slot length would increase, and so riders could be inserted at will.

BRIEF DESCRIPTION OF THE DRAWINGS

FIG. 2 is an exploded view of the sign showing the frame and a foot.

FIGS. 2a is perspective view of one of the end caps;

FIGS. 2b and 2c show joints between the side and top tubes, viewed from below and above, respectively.

Similar reference characters designate corresponding parts throughout the several figures of the drawings.

DESCRIPTION OF THE PREFERRED EMBODIMENT

Figure 1:
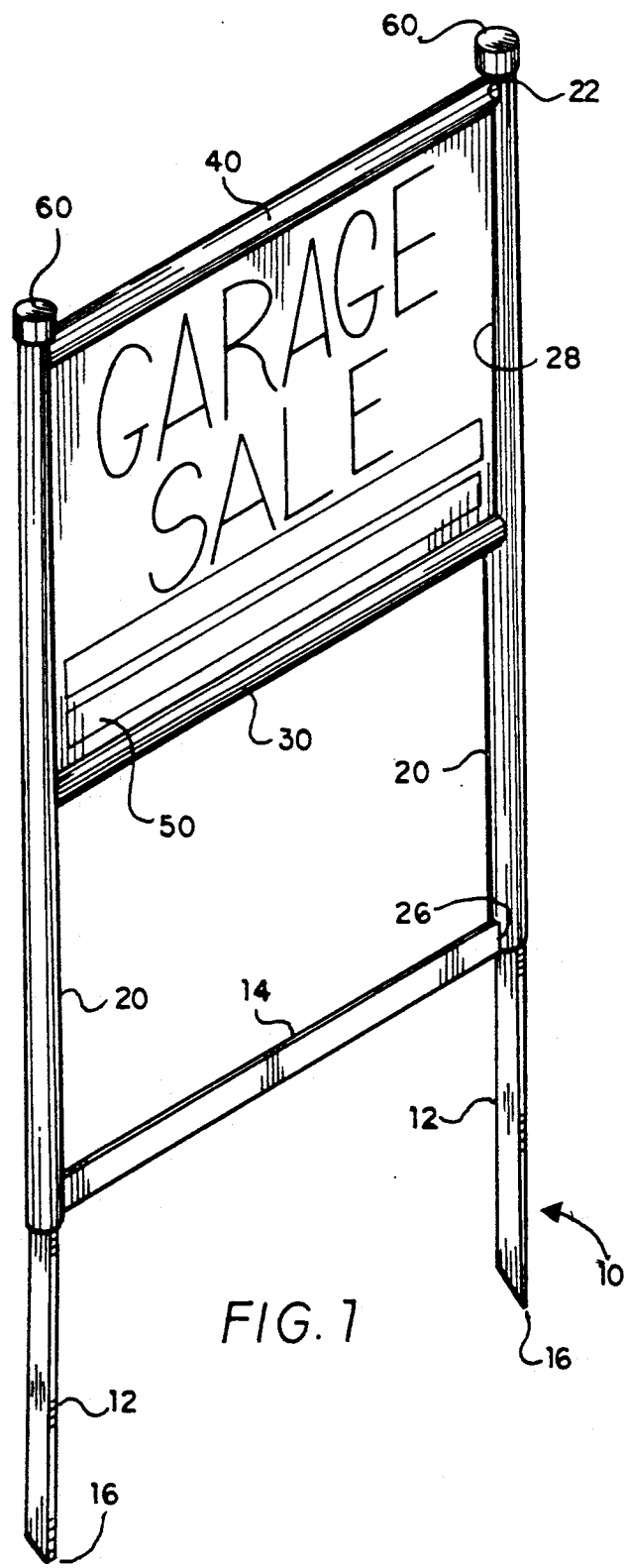
FIG. 1 is a perspective view of the assembled sign.

FIG. 1 shows an overview of the preferred embodiment of the sign. The sign board 50 is a thin, flat rectangle of sturdy weatherproof material. The sign board can be printed with the desired message, or, the board can be blank and act to support on one or both sides a thin paper or plastic sheet bearing the message. In the latter case the thin sheet may be changed without disassembling the sign.

The board is held on all four sides by the surrounding tubes. These are the two side tubes 20, the bottom tube 30, and the top tube 40. The tubes are of semi-rigid plastic tubing which is inexpensive, light in weight, availble, and easily worked. Each has a slot cut through the tube wall on the side toward the edge of the board. If the slot is of the proper width, it will hold in place by friction both the sign board and/or the separate printed message sheets on either side of the sign board. The elastic nature of the plastic tubes insures that the slot edges will be sprung and grip the sign board edges, whether or not the paper or plastic message sheets are placed on the faces of the sign board and so vary the total thickness gripped by the slot edges.

Referring again to FIG. 1, external end caps 60 cover the ends of the side tubes both for appearance and to keep out water. This cap is detailed in FIG. 2a. Internal ends caps can also be employed.

In FIG. 1 the frame 10 is shown inserted into the side tubes 20. Cross rail 14 and the lower ends of posts 12 of the frame are visible in FIG. 1. The entire frame is shown separately in FIG. 2. Preferably, the frame is welded together of rectangular-section steel bar stock. The long axis of the rectangle is vertical for the rail, and normal to the plane of the sign for the posts.

The upper ends of the frame posts 12 are of such cross-sectional dimension that they can slide into the interiors of the two side tubes 20. Because of the semi-rigid nature and slippery surface of plastic tubing, the posts provide a snug fit and hold to the tubes by friction, yet still may be inserted by hand. This makes for easy assembly and knock-down of the sign.

Short slots 26 in the lower end of either side tube can be provided to permit the side tubes to slide over the cross rail of the frame. These slots help to align the side tubes during assembly of the sign and increase the mutual engagement length between the frame posts and side tubes. In applications where the frame rail is driven against the earth, the extra engagement will improve the appearance of the sign by hiding the frame entirely.

The lower ends of the frame posts 16, shown in FIG. 1 and FIG. 2, are pointed or sharpened for easy insertion into the earth. The cross rail of the frame may be simply pushed into the earth by stepping on it.

The top and bottom tubes 30 and 40 are of smaller diameter than the side tubes. This is to allow for easy and attractive joining of these tubes. If a cylindrical hole, of diameter equal to the outer diameter of the top or bottom tube, is drilled normal to the axis of the side tube, and the drill passed through one side only of the larger-diameter side tube, then the top or bottom tube can be inserted into the hole. This both locates the smaller tube end in two dimensions and also hides the end of the smaller tube, thus obviating smoothing of any roughness due to sawing the smaller tube.

The upper ends of the frame posts 12, above the rail 14, may be long or short. If short, they will lend less support to the side tubes 20 when inserted thereinto. In the case that the side tubes have so little support that the top tube 40 may come of one of the holes 22, the ends of the top tube 40 may be better fixed to the side tubes by one of the methods shown in FIGS. 2c, 3a, and 3b.

FIG. 2c is plan view into the top end of a side tube, showing one method of fastening the tubes. The top tube 40 is inserted into hole 22, and then screw 62 is screwed into the top tube 40, preventing that tube from pulling out of the hole 22. For appearance, the end of the side tube can be covered with an end cap 60, shown in FIG. 1.

The screw 62 is preferably made of stainless steel, or other material which will not corrode or cause stains in outdoor use.

For appearance, an end cap 60 covers the screw.

Figure 3A:
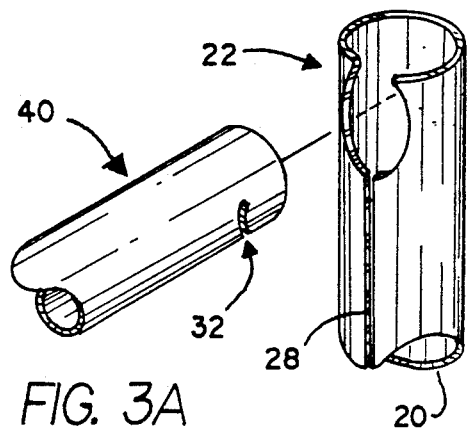
FIGS. 3a and 3b, both perspective views, show other embodiments of the joint between the side tube and the cross tube.

FIG. 3a shows a joint which can be "snapped" together without tools. Hole 22 in side tube 20 is cut into the end of the side tube. An arcuate groove 32 is optionally cut into the surface of the top tube 40.

Figure 3B:
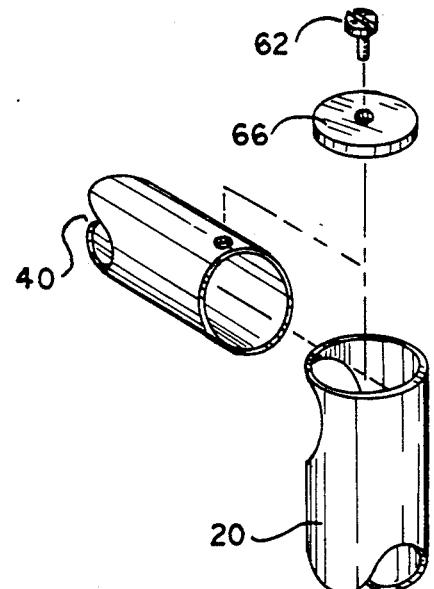

FIG. 3b shows a plastic plug or washer 66 shaped to fit into the interior end cross section of the side tube, held within the tube end by the screw 62. The plug 66 improves the appearance of the tube joint, making the end cap 60 unnecessary.

Another joint, not shown in the figures, would be used with side and top or bottom tubes of the same diameter: end cuts at 45 degrees could be butted so that the joint between the tubes is also 45 degrees and no gap would appear between the tube ends. This form of joint is frictionally held together by an internal L-shaped member which is jammed into the joint upon assembly. This joint would also be attractive in appearance.

A foot 70, shown in FIG. 2, is for indoor use of the sign (or where ever penetration of a surface by the pointed lower post ends is not possible). The vertical tube 72 is of the same material as the side tubes 20. A ground bar or ground tube 74 is rigidly fixed to the vertical tube at right angles. Preferably the vertical tube roughly bisects the ground bar.

The two lower ends of the frame posts 12 are each inserted into a foot 70, and the ground bars 74 aligned perpendicular to the plane of the sign. Alternatively, the vertical tube 72 may have internal chocks (not shown) to prevent insertion of the frame at any other angle.

Figure 4:
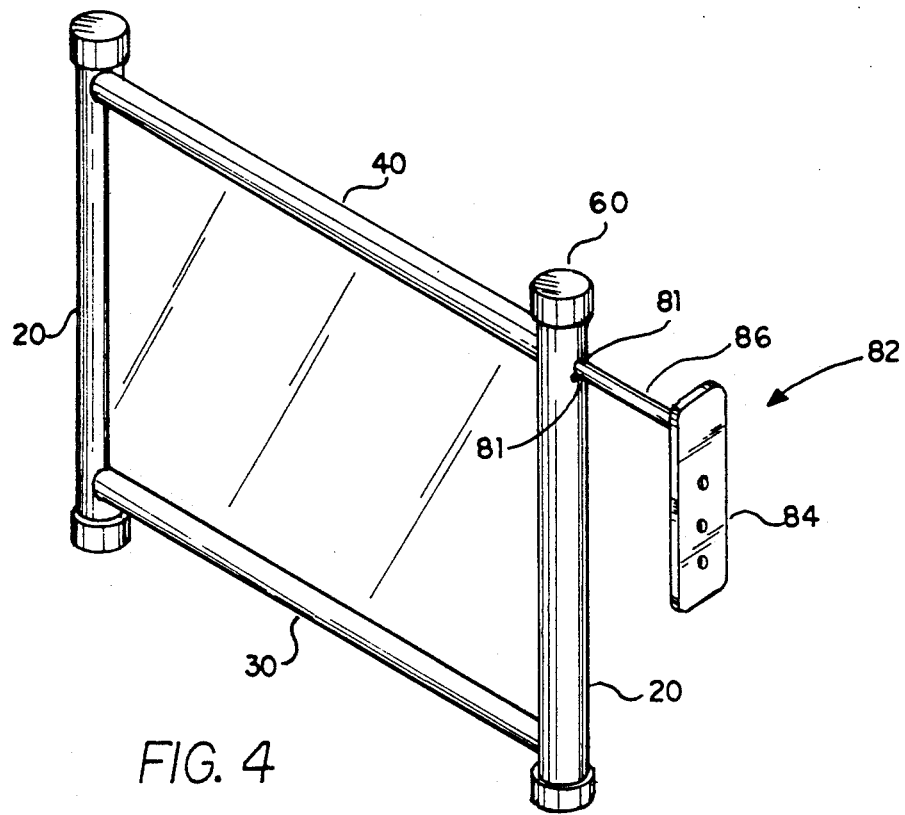
FIGS. 4 and 4a show a hanging embodiment of the sign.
Figure 4A:
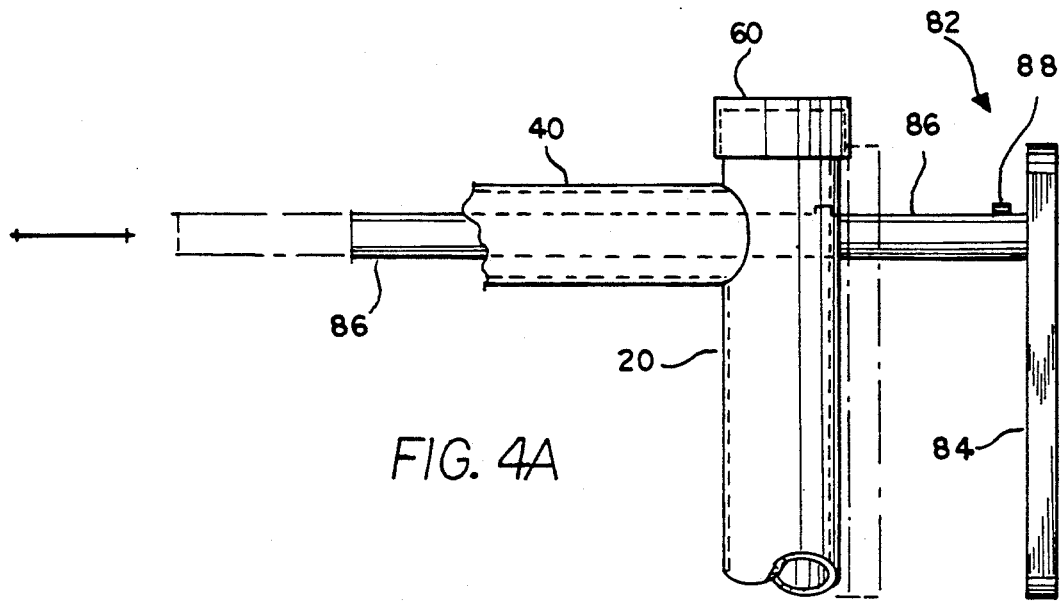

FIG. 4 shows a hanging embodiment of the sign, which has no frame. Both the top tube 40 and the bottom tube 30 are joined to the side tubes 20 by screws, or by any of the other methods discussed above. A hole 80 is drilled through the outside of a side tube colinear with the longitudinal axis of the top tube 40. The hole has a notch 81 along the rim.

A steel bracket 82 consists of a plate 84 and a rod 86 welded to the plate. The rod is inserted into the hole 80, which is of such diameter as to accept it. The bracket can be mounted to a vertical supporting surface by means of screw holes.

Protrusion 88 on rod 86 serves to lock the rod 86 into the hole 80. The protrusion 88 is of such size as to pass through the notch on the rim of the hole 80 at one particular rotation angle of the rod. At any other angle, it is kept inside, locking the rod axially and preventing separation of the sign from the rod.

It is to be understood that the present invention is not limited to the sole embodiment described above, but encompasses any and all embodiments within the scope of the following claims.

I claim:

1. A modular sign comprising:
   an H-shaped frame comprising two vertical posts of equal length, each of said posts having an upper and a lower end; said posts being rigidly fixed to a single horizontal cross rail, so that the posts are parallel to one another and at right angles to the cross rail, and the cross rail is fixed to the posts at points distant from the ends of the posts; and
   a display element, said display element including
   two elongated parallel hollow side tubes each having an open end adapted to slidingly accept one of the upper ends of the frame posts,
   an essentially flat, rectangular sign board having two vertical edges, a top edge, and a bottom edge,
   a slot in each of said side tubes parallel to the long axis of the side tube to accept and hold a vertical edge of the sign board,
   a top tube having a slot for accepting and holding the top edge of the sign board, and
   a bottom tube having a slot for accepting and holding the bottom edge of the sign board, wherein
   the top tube is joined to both of the side tubes and the bottom tube is joined to both side tubes; and
   an aperture in the side tube for accepting an end of the top tube;
   a plug adapted to cooperate with an interior cross section of the side tube and inserted into an upper end of the side tube; and
   a fastener fixing the plug to the portion of the top tube inserted into the side tube; whereby
   said frame may be partially inserted into the display element to hold the display element, and
   the top tube, bottom tube, and sides tubes when assembled form a complete border around the edges of the sign board.

* * * * *